United States Patent [19]

Ames

[11] 4,164,614
[45] Aug. 14, 1979

[54] TERPOLYMER COMPOSITIONS USEFUL AS PRESSURE-SENSITIVE ADHESIVES

[75] Inventor: William A. Ames, Longview, Tex.

[73] Assignee: Eastman Kodak Company, Rochester, N.Y.

[21] Appl. No.: 917,778

[22] Filed: Jun. 21, 1978

[51] Int. Cl.$^2$ .......................................... C08F 212/08
[52] U.S. Cl. ............................. 526/264; 260/45.7 S; 260/45.85 R; 260/45.95 R; 428/355
[58] Field of Search ................................... 526/264

[56] References Cited

U.S. PATENT DOCUMENTS

| | | | |
|---|---|---|---|
| 3,725,122 | 4/1973 | Reinhard et al. | 526/264 |
| 3,728,148 | 4/1973 | Pietsch et al. | 526/264 |
| 4,053,696 | 10/1977 | Herrle et al. | 526/264 |
| 4,058,655 | 11/1977 | Denzinger et al. | 526/264 |
| 4,086,410 | 4/1978 | Song | 526/264 |

*Primary Examiner*—Harry Wong, Jr.
*Attorney, Agent, or Firm*—Clyde L. Tootle; Daniel B. Reece, III

[57] ABSTRACT

The invention relates to hot melt pressure-sensitive adhesive compositions having a novel combination of properties. More specifically, the invention relates to polymerized terpolymer compositions containing 2-ethylhexyl acrylate, N-vinyl-2-pyrrolidinone and styrene which provide pressure-sensitive adhesives. These terpolymer hot melt pressure-sensitive adhesive compositions have good peel adhesion, shear adhesion and permanent tack.

8 Claims, No Drawings

TERPOLYMER COMPOSITIONS USEFUL AS PRESSURE-SENSITIVE ADHESIVES

This invention relates to hot melt pressure-sensitive adhesive compositions having a novel combination of properties. More specifically, the invention relates to polymerized terpolymer compositions containing 2-ethylhexyl acrylate, N-vinyl-2-pyrrolidinone and styrene which provide pressure-sensitive adhesive compositions having a novel combination of properties.

Pressure-sensitive adhesive (PSA) products have experienced a rapid growth rate in recent years because of their ease of application. Typical pressure-sensitive adhesive applications include, for example, tapes (consumer, industrial, and surgical), labels, decals, films, floor tile and wall and shelf coverings. Until recently, virtually all pressure-sensitive compositions were based on blends of high molecular weight synthetic and natural rubbers with tackifiers. Frequently fillers such as zinc oxide or magnesium oxide are used in PSA formulations which are applied to opaque backing substrates. Typical backing materials include paper, cellophane, plasticized poly(vinyl chloride), polyester film, cellulose acetate film, cloth, foamed polymers (e.g., foamed polystyrene or polypropylene), metal foils, felt, cork and the like.

Acrylic hot melt, pressure-sensitive adhesives normally exhibit excellent peel and tack properties, but are deficient in shear adhesion or creep resistance. They are also transparent, have excellent resistance to ultraviolet light and weathering, and exhibit permanent tack. Almost all acrylic adhesives are applied from solution or emulsion since these types may be modified to yield products with improved shear adhesion. For example, acrylic solution polymers can be prepared which contain a small amount of hydroxyl groups by incorporating 2-hydroxyethyl acrylate or 2-hydroxyethyl methacrylate into the adhesive. A crosslinking material, such as a melamine, can be added to the solution. The polymeric adhesive and crosslinking resin are coated onto tapes or films. The solvent is evaporated and the tapes heated to cause curing or crosslinking to occur between the hydroxyl groups and the melamine resin material. The curing reaction greatly improves the shear adhesion of the composition. Methods are known in the art to achieve similar results with acrylic emulsion adhesives. This approach, however, cannot be used with hot melts, since curing would take place in the molten polymer before it can be coated on the substrate. Once curing occurs, the adhesive could no longer be applied as a hot melt.

Disadvantages of solvent based systems include fire hazards and pollution problems. Also, another disadvantage of both solvent and emulsion based adhesives is the energy requirements necessary for removal of solvent or water and the space requirements for the drying ovens. However, the hot melts of the present invention do not have any of these disadvantages since they are 100% solids compositions. Therefore, it is an advance in the state of the art to provide an acrylic hot melt pressure-sensitive adhesive having a good balance of shear adhesion, peel adhesion, and tack which can be applied as a hot melt adhesive without the necessity for solvent or water removal.

Accordingly, it is one of the objects of this invention to provide a novel pressure-sensitive adhesive.

Another and further object of this invention is to provide a pressure-sensitive adhesive having good adhesive properties which can be applied without the use of a solvent.

A still further object of the invention is to provide an adhesive prepared from an acrylate containing terpolymer composition which is tacky at ambient temperatures.

Another and still further object of this invention is a process for preparing the permanently tacky terpolymer compositions useful as pressure-sensitive adhesives.

A still further object of the invention is the use of these permanently tacky terpolymer compositions as pressure-sensitive adhesives.

In accordance with the present invention it has been found that a terpolymer composition containing 2-ethylhexyl acrylate, N-vinyl-2-pyrrolidinone and styrene provides a hot melt pressure-sensitive adhesive having a novel adhesive composition having a unique combination of properties. The terpolymer composition contains from 80 to 60 weight percent 2-ethylhexyl acrylate, preferably 70 weight percent, from 25 to 15 weight percent N-vinyl-2-pyrrolidinone, preferably 20 weight percent, and about 15 to 5 weight percent styrene, preferably 10 weight percent.

When the amount of 2-ethylhexyl acrylate is greater than 80% the shear adhesion strength is too low to be used as a commercially acceptable adhesive. Below 60 percent the glass transition temperature is too high for the composition to exhibit pressure sensitive properties at temperatures much lower than 0° C. When the amount of N-vinyl-2-pyrrolidinone is greater than 25% the shear strength would be too low and the cost of the adhesive would increase as the N-vinyl-2-pyrrolidinone is the most expensive component, and if less than 15%, the adhesive shear strength is too low. If the amount of styrene is greater than 15% the minimum use temperature limits would be adversely affected since the styrene tends to increase the glass transition temperature. The glass transition temperature has to be low enough so that the terpolymer remains tacky at room temperature to be a satisfactory pressure-sensitive adhesive. At less than 5% styrene, the integrity of the adhesive would not be adequate for the adhesive to be removable without leaving a residue onto the substance on which the removable label was attached.

The terpolymers of the present invention have a melt viscosity of from 25,000 to 200,000, preferably 50,000 to 100,000. Viscosities greater than 200,000 are too viscous for use. Less than 25,000 doesn't have adequate shear strength and leaves residue onto the substrate on which the label was attached. The melt viscosities were determined at 350° F. in a Thermosel viscometer.

The terpolymers can be applied to tapes or labels by conventional means such as doctor blades, extrusion coating equipment, and the like.

The terpolymers are prepared by polymerizing the monomers in a conventional solution polymerization using a free radical polymerization catalyst, such as azobisisobutyronitrile.

Suitable reaction vessels include those made from glass or metal. For example, the reactions may be conducted in glass flasks, glass lined reactors, steel autoclaves, and the like. The reactions may be conducted in the presence of an inert gas such as nitrogen. Although not required, it is desirable to carry out the reaction in the presence of an inert solvent such as hexane or benzene and the like.

The pressure-sensitive adhesives of this invention may be stabilized by the addition of conventional stabilizers for polyolefin materials such as dilauryl thiodipropionate, Plastanox 1212 (lauryl stearyl thiodipropionate), Irganox 1010 [pentaerythritol tetrakis[3-(3,5-di-tert-butyl-4-hydroxyphenyl)propionate]], Eastman Inhibitor DOPC (dioctadecyl p-cresol), Plastanox 2246 [2,2'-methylene bis(4-methyl-6-tert-butylphenol)], and Ethyl 702 [4,4'-methylene bis(2,6-ditert-butylphenol)], or combinations of such stabilizers. Effective stabilizer concentrations may range from about 0.1 to about 0.5% by weight. For example, 0.25% Irganox 1010 or a combination of 0.25% Irganox 1010 with 0.25% Plastanox 1212 provides good melt viscosity and color stability when the adhesive is maintained in molten form at 350° F. for 8 hours or longer.

The adhesives of the invention may be used alone or in mixture with other materials such as polyterpenes such as those commercially available and sold as "Nirez 1100", "Nirez 1100", "Nirez 1135", "Piccolyte S10", "Piccolyte 40", "Piccolyte 100", or "Piccolyte 135"; hydrocarbon resins such as "Piccopale 85", "Piccopale 100", "Staybelite", or DAC-B hydrocarbon resin.

Small amounts of pigments, colorants, and other additives may be added to the peroxide-treated polyolefins as desired.

This invention can be further illustrated by the following examples although it will be understood that these examples are included merely for purposes of illustration and are not intended to limit the scope of the invention.

EXAMPLE 1

Five-tenths of a g. of VAZO 64 (azobisisobutyronitrile) was dissolved in a mixture consisting of 140 g. of 2-ethylhexyl acrylate, 40 g. of N-vinyl-2-pyrrolidinone, and 20 g. of styrene. This solution and 200 ml of hexane were charged to a 1-l. flast fitted with stirrer, condenser, thermowell, and $N_2$ bubbler. The reagents were heated to 50° C. under $N_2$ with stirring. After 20 hours, an additional 0.25 g. of VAZO 64 was added. The temperature was increased to 60°–70° C. 24 hours later after polymerization had occurred and held for an additional 5 hours. Product was recovered by vacuum stripping.

The adhesive was transparent with a slight yellow cast. It had the following properties:
  Melt Viscosity @ 350° F. = 75,000 cp
  Shear Adhesion = 197 minutes
  180° Peel Adhesion = 2.86 lbs./in.
  Residue = None
  Probe Tack = 690 gms/cm$^2$
  Tg = −24° C.

This example shows that the adhesive composition has a desirable combination of good peel and shear adhesion. In addition it has a low Tg and does not transfer adhesive from the MYLAR tape to the steel panel in the 180° peel adhesion test.

The melt viscosities were determined at 350° F. in a Thermosel viscometer.

The adhesives were coated from the melt onto 2 mil MYLAR film. The film strips were 1 inch wide and approximately 14 inches long. The molten polymer was poured onto the MYLAR tape. The tape was drawn under a doctor blade to deposit adhesive 1 mil±0.2 mils in thickness. The tapes were aged 24 hours in a dust free chamber before testing.

The 180° peel adhesion values were determined using Pressure Sensitive Tape Council test PSTC-1. The values are reported in lbs./in. The amount of residue remaining after the tape was removed from the steel panel was determined and is reported as percent residue.

The shear adhesion values were determined using Pressure Sensitive Tape Council test PSTC-7 with a 1 lb. weight. The time taken for the tape to separate from the panel is reported as the shear adhesion value.

The probe tack values were determined on a Polyken Probe Tack Tester. The values reported are the average of 5 determinations.

The glass transition temperatures were determined on a Perkin Elmer DSC-2 Differential Scanning Calorimeter.

EXAMPLE 2

A mixture or 140 g. of 2-ethylhexyl acrylate, 40 g. of N-vinyl-2-pyrrolidone and 20 g. of styrene was dissolved in 200 ml. of toluene and added to a 500 ml. three-neck round bottom flask equipped with a mantel, a mechanical stirrer, reflux condenser, gas inlet tube and thermometer. About 0.75 g. of azobisisobutyronitrile was added after the system was purged with nitrogen and heated to a temperature of 55° C. for six hours. The system was then cooled and the terpolymer recovered. The yield was quantitative. The terpolymer contained 70 weight percent 2-ethylhexyl acrylate, 20 weight percent N-vinyl-2-pyrrolidinone and 10 weight percent styrene, and had a melt viscosity at 350° F. of 5,375 cp. A part of the terpolymer was coated onto MYLAR tape and the adhesion properties and percent residue determined. The following properties were determined:
  Shear Adhesion = 45 minutes
  180° Peel Adhesion = 7.7 lbs./in.
  Residue = 60%
  Probe Tack = 948 g./cm.$^2$ This example shows the effect of lowering the viscosity on the adhesive properties of the terpolymer. Although the 180° peel adhesion and probe tack values are increased, the shear adhesion decreases. And since the adhesive transfers from the MYLAR tape it would not be acceptable in removable tape and label applications.

EXAMPLE 3

The procedure of Example 1 was repeated except that the monomer mixture polymerized contained 130 g. of 2-ethylhexyl acrylate, 45 g. of N-vinyl-2-pyrrolidone, and 25 g. of styrene and benzene was used as the solvent. The terpolymer contained 65 weight percent 2-ethylhexyl acrylate, 22.5 weight percent N-vinyl-2-pyrrolidone, and 12.5 weight percent styrene, and had a melt viscosity at 350° F. of 28,500 cp. The adhesive properties were:
  Shear Adhesion = 250 minutes
  180° Peel Adhesion = 2.7 lbs./in.
  Probe Tack = 554 g./cm$^2$
  Residue = None.

EXAMPLE 4

The procedure of Example 3 was repeated using a monomer mixture of 160 g. of 2-ethylhexyl acrylate, 20 g. of N-vinyl-2-pyrrolidone, and 20 g. of styrene. The terpolymer contained 80 weight percent 2-ethylhexyl acrylate, 10 weight percent N-vinyl-2-pyrrolidinone and 10 weight percent styrene and had a melt viscosity of 49,500 cp. at 350° F. The adhesive properties were:
  Shear adhesion = 50 minutes
  180° Peel Adhesion = 3.3 lbs./in.
  Probe Tack = 798 g.

Residue=None

It is noted that lowering the N-vinyl-2-pyrrolidinone to 10 decreased the shear adhesion properties even though the adhesive had a high viscosity.

EXAMPLE 5

The procedure of Example 1 was repeated except that the monomer mixture was 80 g. of 2-ethylhexyl acrylate, and 20 g. of N-vinyl-2-pyrrolidinone and toluene was used as the solvent. The copolymer contained 80 weight percent 2-ethylhexyl acrylate and 20 weight percent N-vinyl-2-pyrrolidinone and had a melt viscosity at 350° F. of 37,000 cp. The adhesive properties were as follows:

Shear Adhesion=9 minutes
180° Peel Adhesion=5.5-9 lbs./in.
Residue=>50%
Probe Tack=810 g./cm$^2$
Tg=−39° C.

EXAMPLE 6

Example 5 was repeated except this polymerization was made in bulk and that 20 g. of styrene was used in place of the N-vinyl-2-pyrrolidinone to prepare a copolymer containing 80 weight percent 2-ethylhexyl acrylate and 20 weight percent styrene. The copolymer had a melt viscosity of 70,000 cp. at 350° F. and the adhesive properties were:

Shear Adhesion=18 minutes
180° Peel Adhesion=1.98 lbs./in.
Residue=0
Probe Tack=484 g./cm$^2$
Tg=−24° C.

Examples 5 and 6 show that a copolymer adhesive prepared from only two of the monomeric components does not provide an adhesive having the unique combination of glass transition temperature and shear strength necessary to provide a commercially useful pressure-sensitive adhesive.

The terpolymer adhesives of this invention are useful as pressure-sensitive adhesives. As pressure-sensitive adhesives they find utility in preparing tapes by applying the adhesive by conventional hot melt procedures to a substrate such as a film which can be prepared from conventional film materials such as a polyester, for example. The pressure-sensitive adhesive can also be applied onto labels, decals, floor tile as well as wall coverings such as wallpaper, and shelf coverings, such as shelf paper.

Although the invention has been described in considerable detail with particular reference to certain preferred embodiments thereof, variations and modifications can be effected within the spirit and scope of the invention.

I claim:

1. A pressure-sensitive adhesive comprising a polymerized terpolymeric composition comprising about 80 to 60 weight percent 2-ethylhexyl acrylate, about 25 to 15 weight percent N-vinyl-2-pyrrolidinone, and about 15 to 5 weight percent styrene and having a melt viscosity of about 25,000 to 200,000 and has good peel adhesion and shear adhesion.

2. A terpolymer composition according to claim 1 wherein said 2-ethylhexyl acrylate is present in an amount of about 70 weight percent.

3. A terpolymer composition according to claim 2 wherein said N-vinyl-2-pyrrolidinone is present in an amount of about 20 weight percent.

4. A terpolymer composition according to claim 3 wherein said styrene is present in an amount of about 10 weight percent.

5. A terpolymeric composition according to claim 1 having a viscosity of from 50,000 to 100,000.

6. A terpolymer composition according to claim 5 wherein said 2-ethylhexyl acrylate is present in an amount of about 70 weight percent.

7. A terpolymer composition according to claim 6 wherein said N-vinyl-2-pyrrolidinone is present in an amount of about 20 weight percent.

8. A terpolymer composition according to claim 7 wherein said styrene is present in an amount of about 10 weight percent.

* * * * *